United States Patent [19]

Green

[11] 4,269,597
[45] May 26, 1981

[54] FINGER ARITHMETIC DEVICE

[76] Inventor: Martin Green, 243 Franklin Turnpike, Mahwah, N.J. 07430

[21] Appl. No.: 69,816

[22] Filed: Aug. 27, 1979

[51] Int. Cl.³ .............................................. G09B 19/02
[52] U.S. Cl. ..................................................... 434/198
[58] Field of Search ........................ 35/31 R, 31 A, 74

[56] References Cited

U.S. PATENT DOCUMENTS

| 1,457,223 | 5/1923 | Gallup | 35/74 |
| 1,548,601 | 8/1925 | Hoeft | 35/31 R X |
| 1,581,390 | 4/1926 | Cook | 35/74 |
| 2,471,271 | 5/1949 | Green | 35/31 A |
| 2,792,993 | 5/1957 | Schramm | 35/31 A X |

FOREIGN PATENT DOCUMENTS 331979  1/1921 Fed. Rep. of Germany .......... 35/31 R

Primary Examiner—William H. Grieb
Attorney, Agent, or Firm—Constantine A. Michalos; Peter C. Michalos

[57] ABSTRACT

An educational device for training in arithmetic utilizing rotatably mounted hand like members which simulate a pair of hands which exhibit a selected numeral on each finger like portion of each hand. Each finger like portion of each hand member is alignable with a finger like portion of the other hand member and with a reference line. In an arcuate area below the reference line and under each hand like portion is disposed a row of tens which are circumferentially aligned with a row of five apertures on each hand like member with each aperture being aligned with a single finger like portion on each hand like member.

Adapters are provided for covering the numerals of each of the finger like portions and displaying a numeral which is a multiple of the numeral appearing on each of the finger like portions respectively. Adapters are also provided for covering each of the arcuate portions and displaying two rows of numerals corresponding to twice said multiple of tens. The mathematical operation which now yields the product of the numbers appearing on the aligned finger like portions comprises multiplying the multiple of the number of fingers above the reference line and adding to the resulting number said multiple of the sum of numbers appearing through the apertures of the hand like portions below the reference line.

5 Claims, 2 Drawing Figures

FINGER ARITHMETIC DEVICE

REFERENCE TO RELATED PATENTS

This application is an improvement in the inventor's earlier invention described in U.S. Pat. No. 2,471,271 issued May 24, 1949 for an educational device, which patent is incorporated by reference here.

FIELD AND BACKGROUND OF THE INVENTION

The present invention relates in general to an educational device and, in particular to a new and useful device for training a user in multiplication and addition with an analogy and operation utilizing forms resembling a pair of human hands.

Although in general, "counting on the fingers" is discouraged in educational institutions, it has been found that the hands can be used as a form of calculator to aid in the performance of multiplication and addition, which, while not only increasing the speed at which these operations can be conducted without the aid of pencil and paper, also trains the mind in these operations and avoids the overdependance of individuals on calculators and adding machines. Especially resently with the advent of very low price and powerful calculator devices, many people have experienced a loss of their ability to solve even simple arithmetic problems in their heads.

The present invention is aimed at restoring and enhancing this capacity and, at the same time, serving as an aid in the visualization of multiplication and addition problems.

SUMMARY OF THE INVENTION

The present invention utilizes a flat base member which may be made of cardboard, sheetmetal, wood or any flat surface. A pair of spaced hand like members are pivotally mounted to this base member. Each hand like member includes a wheel portion which has a periphery which can be engaged by a user in order to rotate the hand like portions and five finger or digit like portions extending from the wheel portion. A reference line is defined across a portion of the board member which devices the surface of the board member into an upper multiplication area and a lower addition area.

Each wheel portion includes five apertures with each aperture aligned with each finger like portion respectively. An arcuate area is defined beneath the refernce line and extends in a line corresponding to the circumferential line on each of said wheel portions along which said plurality of apertures is disposed.

A numeral appears on or near the end of each finger like portion. By aligning a finger like portion of one hand member with the finger like portion of the other hand member along the reference line and by performing mathematical operation here-in-under described, the product of the numbers appearing on the aligned finger like portions can be determined.

A row of tens is disposed on each arcuate area and alignable with one or more of the apertures in each hand member.

With each hand like member simulating the hand of a user with the palms facing the user, the numerals appearing on the finger like portions may be the numbers six through ten starting with the number six disposed on each finger like portion corresponding to the pinky and the number ten appearing on each finger like portion corresponding to the thumb.

Adapters are provided for covering each of these numerals with a number representing a multiple of the number of the covered numerals and other adapters are provided for covering the arcuate portions and displaying the number corresponding to twice this same multiple of ten.

With no adapters connected to the device initially, the mathematical operation may be performed as follows. The numbers which are to be multiplied together are first chosen and the digits carrying these numbers aligned with each other and with the reference line. The number of digits of one hand member is then mutiplied by the number of digits of the other hand member appearing above the reference line and in the multiplication area. This resulting number is then added to the total sum of numbers appearing in the apertures below the reference line or in the addition area. In this example this summation will be a summation of tens and the resulting addition of this summation to the product will yield the product of the two numbers appearing on the aligned finger like portions.

It has been found that, by doubling the value of each number on each finger like member, the product of the now resulting numbers can still be achieved by with an altered or modified operation.

When the values of the numbers on each finger are doubled, the number of fingers of each hand like member appearing above the reference line must first be doubled before they are multiplied together. The value of the tens appearing in the arcuate areas below the reference line must be multiplied by four, that is doubled, then doubled again. Their summation must then be added to the product found from the operation conducted in the multiplication area. This has been found to yield the product of the numbers appearing on the aligned finger portions.

It should be understood that the multiple may also be a fraction, for example one half, and that the formula to be explained hereinafter, holds also for a fractional multiple as well as for multiples comprising an integer. The digits for example can be reduced in value to one half that appearing on the digits and the other numbers reduced according to the formula.

Accordingly, an object of the present invention is to provide an educational device for training in multiplication and addition comprising a base member having a pair of spaced hand like members rotatably mounted thereon. Each hand like member has a wheel portion and five finger portions which represent the spread fingers of a hand. Five circumferencially spaced apertures are positioned on each wheel portion which apertures align with each respective finger portion. The base member includes a reference line which divides its surface into an upper multiplication area and a lower addition area.

Arcuate areas are defined below the reference line and beneath each of the wheel portions with each arcuate are including a row of the numerals ten aligned on the same circumferencial line as that containing the apertures. Each of the finger portions has a numeral thereon which is alignable with a finger portion of the other hand member and with the reference line. The product of the numerals of the aligned finger portions can be obtained by multiplying the number of finger portions above the reference line of one hand member by the number of finger portions above the reference line of the other hand member and by adding to this resulting product the sum of tens appearing through the apertures below the reference line.

Finger portion adapters are provided which carry a number which represents a multiple of the number appearing on each of the finger like portions and arcuate area adapters are provided including a row of numbers corresponding to twice the multiple of ten. To find the product of the numbers which are now alignable with the reference line, the above mathematical operation is repeated, however the number value of the digits or finger portions above the reference line is multiplied by the multiple and the summation of numbers below the reference line is multiplied also by one half the multiple before the product is found.

Another object of the present invention is to provide a simple educational device which utilizes an analogy showing a representation of the human hands which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figure 1:
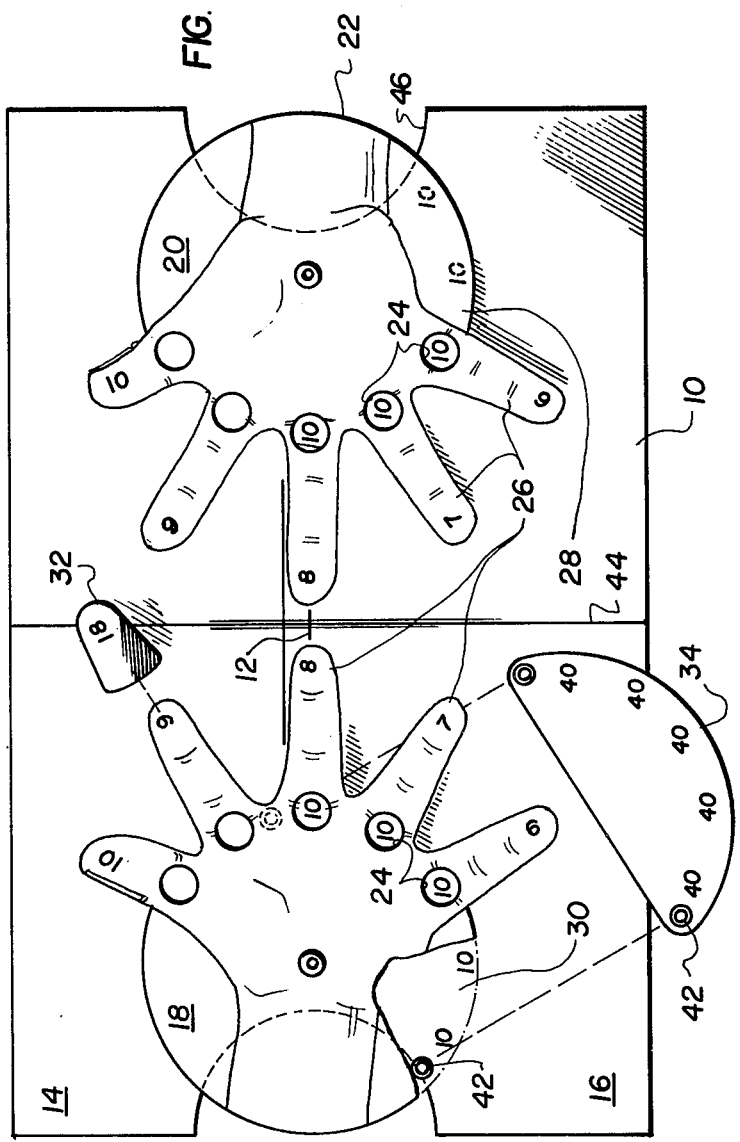
FIG. 1 is a top plan view of the educational device according to the invention with suitably provideable adapters shown in positions before they are incorporated in the operation of the device.

Referring now to the drawings in particular, the invention embodied therein in FIG. 1 comprises, a base member 10 having a surface with a reference line 12 thereon dividing the surface into a multiplication area 14 at the upper portions of base member 10 and an addition area 16 at the lower portions thereof.

A pair of spaced pivotally mounted hand like members 18 and 20 respectively are mounted to the base member 10. Each hand like member includes a wheel portion 22 having circumferencially spaced apertures 24 and five finger like members or finger portions 26 extending from the wheel portion and representing the spread fingers of a hand.

A pair of arcuate areas represented at 28 and 30 are provided on the base member 10 and include a row of digits here shown as the numbers 10. The apertures 24 are provided on the wheel portion 22 in a circumferencial line which traverses the arcuate areas 28 and 30 and expose a selected number of digits in the row which can be seen through the apertures 24.

Each finger portion 26 carries a numeral here shown as the numbers six through ten with the number six appearing on the finger portion representing a pinky and the numbers ten appearing on the finger portion representing the thumbs of the respective hand like portion.

A multiplication operation can be performed between the numbers appearing on the digits of one hand and those appearing on the digits of the other hand by aligning the finger portions carrying the number to be multiplied of one hand with the reference line 12 and aligning the finger portion having the number to be multiplied of the other hand also on the reference line. The multiplication operation, which is explained in detail in the inventor's former U.S. Pat. No. 2,471,271, is achieved by multiplying the number of digits appearing above the reference line of one hand like member by the number of digits appearing above the reference line of the other hand like member to produce a resulting number. This result is then added to the summation of the numbers appearing through the apertures in the addition area 16.

The present invention utilizes a plurality of finger adapters and arcuate area adapters for changing the values of the numbers appearing on the finger like portion and the values of the numbers appearing in the rows of the arcuate areas. FIG. 1, one adapter 32 for the fingers is shown and one adapter 34 for the arcuate areas is shown. It should be understood that each finger and each arcuate area in operation would be provided with a similar adapter. The number appearing on each finger adapter, represents a multiple of the number appearing on the finger portion for which the adapter is utilized. In the example shown in FIG. 1, the multiplier is the number 2. The value of the numbers on the arcuate area adapters however, is multiplied by twice the multiple of that multiplied by the value of the numbers for the finger portions so that, in the example shown, the adapter will carry a plurality of the numbers forty.

The new operation is also modified, but in a manner which is logically related to the multiplier used. Where the multiplier is two, the number value of the number of digits above the reference line for each hand portion is doubled. The product value of the numbers appearing through the apertures below the reference line is also doubled and this resulting number, when added to the product received or produced in the multiplication area 14, will yield the product of the new numbers of the digits which have been aligned with the reference line 12.

Using FIG. 1 to run through one example using the adapters, assume, as shown, the finger portions originally carrying the numbers 8 are aligned with the reference line 12. The number value of these digits has now been increased to 16 when a suitably provided adapter is positioned over these finger portions. The adapters for the arcuate areas also now provide a row of forty's which are to be used in the operation. For reference, $16 \times 16 = 256$.

First, running through the operation in the multiplication area 14, the number of digits of hand member 18 above reference line 12, not including those finger portions aligned with line 12, is 2 and that for hand member 20 is also 2. Doubling this number value for each side, we have the product of $4 \times 4$ which equals 16.

Now turning our attention to the addition area 16, the number of forty's appearing through the apertures in the addition area 16 is 6. Six times forty equals two hundred and forty. Two hundred and forty plus sixteen equals two hundred and fifty six which is the product of the numbers carried by the digits or finger portions aligned with the reference line 12.

Running through an example, where the multiplier is 4 rather than 2, the number value of the digits shown in FIG. 1 aligned with 12 will now each be 32. Thirty two times thirty two for reference equals one thousand two hundred and four. The number of digits above the reference line for each hand must now be multiplied by 4 so that we have the product in the multiplication area 14 of 8×8 which equals 64. The numbers appearing on the adapters 34 are now the numbers 80 or 2×4×10. The number of 80's appearing through the apertures is still 6 and 6×80 is 480. Since higher multiples are used now however, the sum in the addition area 16 must now be doubled to the number 960. 960+64=1,024 which is the product of the aligned numbers on the reference line 12.

Figure 2:
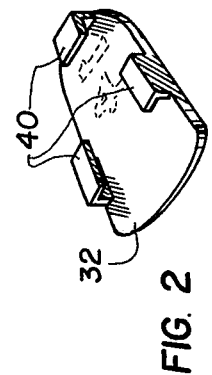
FIG. 2 is a perspective bottom view of one of the finger adapters used in accordance with the invention.

It should be noted from FIG. 2 that the adapters may be made of sheet metal or other suitable material and provided with tabs 40 which aid in their being secured in the finger like portion 26.

The arcuate area adapters 34 may also be provided with snaps or buttons 42 to secure them to the board. The board may also be creased along line 44 so that it may be folded in half in book like fashion. The base member 10 is also provided with two recesses 46 which expose a portion of the periphery of the wheels 22 so that they may be engaged and actuated to rotated the hand members.

While specific embodiments of the invention have been shown and described in detail to illustrate the application of the principles of the invention, it will be understood that the invention may be embodied otherwise without departing from such principles.

What is claimed is:

1. An educational device for training in arithmatic comprising, a base member, a pair of spaced hand like members rotatably mounted on said base member each having a wheel portion and five finger portions extending outwardly therefrom, each of said wheel portions including five circumferencially spaced apertures with each aperture aligned with one of said finger portions, said base member including a reference line dividing the surface thereof into an upper multiplication area and a lower addition area, an arcuate area below said reference line and beneath each of said wheel portions each having a row of numbers 10 aligned with the circumference of said wheel portions containing said apertures, each of said finger portions having a numeral thereon and alignable with said reference line whereby the product of the numerals of the finger portions aligned with said reference line can be obtained by multiplying the number of finger portions in said multiplication area of one hand member by the number of finger portions in said multiplication area of the other of said hand members and adding to this the sum of the numbers 10 appearing through the apertures in said addition area, a finger adapter for each of said finger portions slidable onto each of said finger portions respectively, each finger adapter having a number thereon which is a multiple of the numeral of that finger portion, and an addition area adapter fastenable over each of said arcuate areas having a row of numbers thereon corresponding to twice the multiple times 10 with the numbers of said arcuate area adapters aligned over said rows of ten's whereby the product of the numbers now appearing on the finger portions aligned with said reference line can now be obtained by multiplying the number of finger portions times the multiple of one hand member above the reference line times the number of finger portions times the multiple of the other hand member above the reference line and adding to this the summation the numbers appearing through the apertures in said addition area.

2. An educational device according to claim 1 wherein said base member includes a pair of recesses each exposing a portion of the periphery of each wheel portion whereby each wheel portion can be engaged to rotate and align said finger portions.

3. An educational device according to claim 1 wherein each of said arcuate portion adapters includes a pair of snaps which can be snapped into corresponding snaps provided on said base member.

4. An educational device according to claim 1 including a central crease line perpendicular to said reference line providing a folding line for said base member so that said base member may be folded in half to cover said rotatably mounted hand members.

5. An educational device according to claim 1 wherein said base member is made of cardboard, said hand members are made of cardboard, and said finger and arcuate portion adapters are made of sheet metal.

* * * * *